Patented May 4, 1954

2,677,697

UNITED STATES PATENT OFFICE 2,677,697

BASIC DERIVATIVES OF SUBSTITUTED CINNAMIC ACIDS AND METHODS OF PREPARING SAME

William A. Lott, Maplewood, N. J., assignor to Mathieson Chemical Corporation, New York, N. Y., a corporation of Virginia No Drawing. Application August 30, 1951, Serial No. 244,473

15 Claims. (Cl. 260—473)

This invention relates to, and has for its object the provision of, compounds of the class consisting of: (A), bases of the general formula

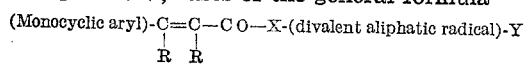

wherein one R represents a member of the class consisting of aryloxy and arylmercapto groups, and the other R represents hydrogen, Y represents the radical of an amine, and X represents a member of the group consisting of O, NH, and N(alkyl); (B), acid-addition salts thereof; (C), quaternary ammonium salts thereof; and (D), methods of preparing (A), (B) and (C). (The monocyclic aryl group may be unsubstituted or may contain substituents such as alkyl, alkoxy, hydroxy and halo groups.) These compounds are promising therapeutic agents, especially antispasmodics.

Among the preferred compounds are: bases having the following general formula

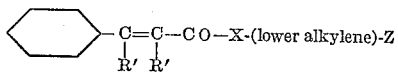

wherein one R' represents aryloxy and the other R' represents hydrogen, X has the meaning given hereinbefore, and Z represents a member of the class consisting of

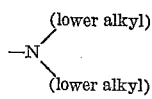

1-piperidyl, 1-pyrolidyl, and 4-morpholinyl groups; the acid-addition salts of said bases; and, the quaternary ammonium salts (with alkyl halides) of said bases.

The basic esters are prepared by a method which essentially comprises interacting an acid (I) of the general formula

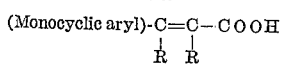

with a basic aliphatic halide (II) of the general formula (halogen)—(divalent aliphatic radical)—Y in an organic solvent for the reactants (especially isopropanol). Thus the following reactants may be used in the practice of this invention:

I

α-Phenoxycinnamic acid
β-Phenoxycinnamic acid[1]
β-p-Cresoxycinnamic acid[1]
β-α-Naphthoxycinnamic acid[1]
α-Phenoxy-p-hydroxycinnamic acid (U. S. Pat. 2,503,296)
α-Phenylmercapto - p - hydroxycinnamic acid (U. S. Pat. 2,503,296)
β-(2-methoxyphenoxy)-cinnamic acid
α-(4-bromo-phenoxy)-cinnamic acid
β-(2,4-dimethylphenoxy)-cinnamic acid
β-(2,4-dimethylphenylmercapto)-cinnamic acid
β-Naphthylmercapto-cinnamic acid[1]
β-Phenoxy-p-methoxycinnamic acid[1]
β-Phenoxy-p-methylcinnamic acid[1]
β-Phenoxy-p-chlorocinnamic acid[1]

II

β-Diethylaminoethyl chloride
γ-Diethylaminopropyl chloride
γ-(1-piperidyl)-propyl chloride
β-(1-pyrrolidyl)-ethyl chloride
β-(4-morpholinyl)-ethyl chloride
γ-Diethylamino-β,β-dimethylpropyl chloride
β-(1-piperidyl)-ethyl chloride
β-Diethylaminoisopropyl chloride
β-Dimethylaminoisopropyl chloride
β-Chloro-α-diethylaminobutane Alternatively, the esters may be prepared by the method essentially comprising interacting the acyl halide derived from acids I with a basic aliphatic amino alcohol (III), containing a secondary or tertiary amino group, in an organic solvent for the reactants.

Thus the following alcohols III may be used in the practice of this invention:

α-Methyl-α-dimethylaminomethyl-amyl alcohol
β-(1-piperidyl)-ethanol
β-(1-pyrrolidyl)-ethanol
β-Diethylaminoethanol
β-(4-morpholinyl)-ethanol
γ-Diethylamino-β,β-dimethylpropanol
β,β'-Di-(dimethylamino)-isopropanol
γ-Dimethylaminopropanol
β-Diethylamino-α-ethyl-ethanol
β-Dibutylaminoethanol
N-ethylethanolamine
N-methylpropanolamine
β-(Ethylamylamino)-ethanol
β-Dimethylaminoethanol
γ-Diethylaminopropanyl
γ-Diethylamino-α,β-propanediol The basic amides are prepared by a method which essentially comprises interacting an acyl halide, derived from acids I, with an aliphatic diamine (IV) containing at least one free amino hydrogen, in an organic solvent for the reactants. The utilizable diamines IV include inter alia:

N,N-diethylethylenediamine
1-(β-aminoethyl)-piperidine
1-amino-5-diethylaminopentane
1-amino-4-diethylaminobutane
[(β-Dimethylaminoethyl)-amino]-ethane
N,N-dimethylethylenediamine
N,N-dipropylethylenediamine In the above methods the acid-addition salts (e. g., the hydrochlorides, if the halogen reactant

---

[1] These β-substituted cinnamic acids may be obtained by the method described in J. C. S. 77, 984 (1900).

is chlorine) rather than the free bases are ordinarily obtained. If desired, these acid-addition salts may be converted to the free bases in the conventional manner, i. e., by neutralization with alkali; and the free bases may be converted to other acid-addition salts by reacting the base with the desired acid in a suitable solvent. The utilizable acids comprise, inter alia: hydrobromic, boric, nitric, lactic, tartaric, citric, succinic, phosphoric, sulfuric, maleic, fumaric and (especially) hydrochloric.

By the addition of alkyl halides, alkylene halides, aryl sulfonic acid esters, dialkyl sulfates, aralkyl halides, aryl halides, or the like, there are obtained in the usual manner quaternary salts of the basic esters and amides (A) described hereinbefore.

The following examples are illustrative of the invention:

EXAMPLE 1

N-(β-diethylaminoethyl)-α-phenoxycinnamamide hydrobromide

A solution of 27 g. N,N-diethylethylenediamine in 200 ml. benzene is added dropwise with cooling (10° C.) to a solution of 60 g. α-phenoxycinnamoyl chloride in 300 ml. benzene. The mixture is refluxed for two hours, at which time about 75% of the benzene is distilled and the residue is cooled and diluted with 500 ml. ether. The precipitated gum is then dissolved in 200 ml. water, and extracted with 200 ml. ether. The aqueous solution is alkalinized with potassium carbonate extracted with 250 ml. ether and the extracts are dried and acidified with dry hydrogen bromide until faintly acid to Congo red paper. The product, recrystallized from 170 ml. ethanol, yields about 26 g. of the hydrobromide acid-addition salt, melting at about 124–125° C.

EXAMPLE 2

β-(Diethylaminoethyl)-α-phenoxycinnamate hydrochloride

A solution of 12 g. α-phenoxycinnamic acid and 6.78 g. β-diethylaminoethyl chloride in 100 ml. isopropanol is refluxed for two hours, and the isopropanol removed under reduced pressure. The residue when recrystallized three times from 125 ml. ethanol yields about 11.4 g. of the acid-addition salt melting at about 172–173° C.

EXAMPLE 3

N-(β-Dimethylaminoethyl)-α-phenoxycinnamamide hydrochloride

A solution of 8.5 g. N,N-dimethylethylenediamine in 100 ml. benzene is added dropwise with cooling (10° C.) to a solution of 25 g. α-phenoxycinnamoyl chloride in 100 ml. benzene. After the mixture has been allowed to stand overnight, the product is filtered and recrystallized from 210 ml. of an alcohol-ether solution to give about 22 g. of the acid-addition salt melting at about 158–159° C.

EXAMPLE 4

N-(β-Dipropylaminoethyl)-α-phenoxycinnamamide hydrochloride

A solution of 13.95 g. N,N-dipropylethylenediamine in 100 ml. benzene is added to a solution of 25 g. α-phenoxycinnamoyl chloride with cooling at 10° C. After the addition, the mixture is refluxed for three hours, cooled and diluted with ether. The product is filtered and recrystallized from 160 ml. methyl ethyl ketone to give 13 g. of the acid-addition salt melting at about 134–135° C.

EXAMPLE 5

β-(Diethylaminoethyl)-β-phenoxycinnamate hydrochloride

A solution of 12 g. β-phenoxycinnamic acid [J. Chem. Soc. 77, 985 (1900)] and 6.7 g. β-diethylaminoethyl chloride in 100 ml. of isopropanol is refluxed for seven hours; and the isopropanol is distilled off and the residue dissolved in water. The solution is alkalinized with potassium carbonate and extracted with 200 ml. ether. The ether solution is then dried over magnesium sulfate and removed by distillation. The residue is fractionated to give about 9 g. of product boiling at about 189° C./0.5 mm. This material is dissolved in 200 ml. ether and ethereal hydrogen chloride is added until acid to Congo red paper. The precipitate is filtered and recrystallized twice from 210 ml. of an alcohol-ether solution to give about 7 g. of the acid-addition salt melting at about 123–124° C.

EXAMPLE 6

Using a molar equivalent of α-phenylmercapto-p-hydroxycinnamoyl chloride, prepared by reacting the corresponding acid (cf. U. S. Patent 2,503,296) with thionyl chloride, in place of α-phenoxycinnamoyl chloride in Example 3, the corresponding N-(β-dimethylaminoethyl)-α-phenylmercapto-p-hydroxycinnamamide hydrochloride is prepared.

In place of benzene used in the foregoing examples, one may use other organic solvents for the reactants, inter alia, ether and toluene.

The acid-addition salts prepared in Examples 1 through 6, converted to free bases, in the conventional manner, are used to prepare the following quaternary ammonium salts. (If an acid-binding agent is present, the free base is obtained immediately, and the quaternary compounds can be prepared from this by a more direct route.)

EXAMPLE 7

[β-(α-Phenoxycinnamoyloxy)ethyl]-diethylmethylammonium bromide

A solution of 30 g. of β-(diethylaminoethyl)-α-phenoxycinamate hydrochloride, prepared as indicated hereinbefore (cf. Example 2), in 200 ml. of water is alkalinized with potassium carbonate and extracted with ether. The extracts are dried and the ether is distilled. The residue is dissolved in 60 ml. ethanol to which 20 grams of methyl bromide is added. After standing for three days at room temperature, the solution is diluted with ether, and the precipitate is filtered and recrystallized twice from methyl ethyl ketone to yield about 24 grams of material melting at about 119–120° C.

EXAMPLE 8

[β-(α-Phenoxycinnamido)ethyl]-triethylammonium bromide

A solution of 15 g. N-(β-diethylaminoethyl)-α-phenoxy-cinnamamide [prepared from the acid-addition salt (cf. Example 1) in the manner described in the preceding example] in 20 ml. of benzyl alcohol, and 10 g. ethyl bromide in 50 ml. benzyl alcohol is heated at 50° C. for two days, cooled and diluted with 200 ml. ether. The precipitate is filtered and recrystallized from 150 ml. of an ethanol-ether solution to give about 8 g. of material melting at about 109–111° C.

EXAMPLE 9

[β-(α-Phenoxycinnamido)ethyl] - diethylmethylammonium bromide

A solution of 8 g. N-(β-diethylaminoethyl)-α-phenoxycinnamamide, prepared from the acid-addition salt (cf. Example 1) in 20 ml. of methanol and 4 g. of methyl bromide in 35 ml. of methanol is allowed to stand at room temperature for two days. Upon diluting with 100 ml. ether a precipitate forms which is filtered and recrystallized from 220 ml. of an ethanol-ether solution to give about 7.5 g. of material melting at about 94–95° C.

EXAMPLE 10

[β - (α - Phenoxycinnamido)ethyl] - dipropylmethylammonium bromide

A solution of 8 g. N-(β-dipropylaminoethyl)-α-phenoxy-cinnamamide, prepared from the acid-addition salt (cf. Example 4) in 20 ml. of methanol, and 6.1 g. of methyl bromide in 35 ml. of methanol is allowed to stand at room temperature for two days. Upon diluting with 200 ml. ether a precipitate forms which is filtered and recrystallized from 75 ml. of a butanol-ether solution to give about 6 g. of material melting at about 177–178° C.

EXAMPLE 11

[β - (α - Phenoxycinnamido)ethyl] - dimethylethylammonium iodide

A solution of 10 g. of N-(β-dimethylaminoethyl)-α-phenoxy-cinnamamide, prepared from the acid-addition salt (cf. Example 3) in 20 ml. of acetone, and 15.1 g. of ethyl iodide in 100 ml. of acetone is allowed to stand in a pressure bottle at room temperature for two days. The precipitate is triturated with 100 ml. ether, filtered and recrystallized from 25 ml. of an ethanol-ether solution to give about 2 g. of material melting at about 181–182° C.

EXAMPLE 12

[β - (α - Phenoxycinnamido)ethyl] - diethylmethylammonium iodide

A solution of 20 g. of N-(β-diethylaminoethyl)-α-phenoxycinnamamide, prepared from the acid-addition salt (cf. Example 1) in 20 ml. of acetone, and 14 g. of methyl iodide in 100 ml. of acetone and 50 ml. of benzyl alcohol is heated at 50° C. for two days. The solution is cooled and diluted with 350 ml. ether. The solid is filtered and recrystallized from 320 ml. of an ethanol ether solution to give 17.5 g. of material melting at about 144–145° C.

EXAMPLE 13

Using a molar equivalent of α-phenylmercapto-p-hydroxycinnamic acid, in place of α-phenoxycinnamic acid, in Example 2, the corresponding β-(diethylaminoethyl)-α-phenylmercapto-p - hydroxycinnamate hydrochloride is prepared; and a quaternary ammonium salt thereof is prepared as described in Example 7.

EXAMPLE 14

Using a molar equivalent of β-(diethylaminoethyl)-β-phenoxycinnamate, prepared from the acid-addition salt (cf. Example 5), in place of β-(diethylaminoethyl)-α-phenoxycinnamate, in Example 7, [β-(β-phenoxycinnamoyloxy)ethyl]-diethylmethylammonium bromide is obtained.

The invention may be variously otherwise embodied within the scope of the appended claims.

I claim:

1. Compounds of the group consisting of the free base, its acid-addition salts and its lower alkyl halide quaternary salts, the free base having the formula

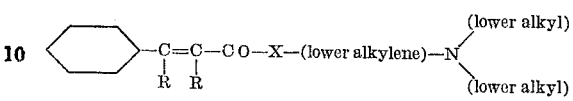

wherein one R represents hydrogen, the other R being a member of the class consisting of phenoxy- and phenylmercapto-; and X is a member of the class consisting of O and NH.

2. The process which comprises reacting (A) a compound of the formula

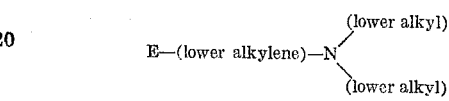

wherein E is a member of the class consisting of hydroxy, halo, and $NH_2$, with (B) a compound of the formula

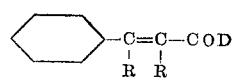

wherein one R represents hydrogen, the other R being a member of the class consisting of phenoxy- and phenylmercapto-; and D is hydroxy when E is halo and halo when E is a member of the class consisting of hydroxy and $NH_2$; and recovering the reaction product.

3. Compounds of the general formula

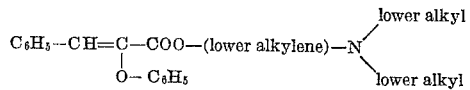

4. Compounds of the general formula

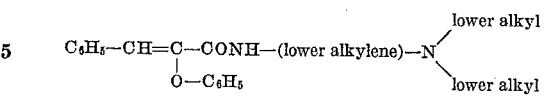

5. Acid-addition salts of the compounds of claim 3.

6. Acid-addition salts of the compounds of claim 4.

7. Lower alkyl halide quaternary salts of the compounds of claim 3.

8. Lower alkyl halide quaternary salts of the compounds of claim 4.

9. The compound [β-(α-phenoxycinnamoyloxy)ethyl]-diethylmethylammonium bromide.

10. The compound [β-(α-phenoxycinnamido)-ethyl]-diethylmethylammonium bromide.

11. The compound [β-(α-phenoxycinnamido)-ethyl]-dipropylmethylammonium bromide.

12. The compound [β-(α-phenoxycinnamido)-ethyl]-diethylmethylammonium bromide.

13. The compound [β-(α-phenoxycinnamido)-ethyl]-triethylammonium bromide.

14. The process of claim 2, wherein the reaction product obtained is reacted with an acid to form an acid-addition salt.

15. The process of claim 2, wherein the reaction product obtained is reacted with an ester of an inorganic acid to form a quaternary ammonium salt.

No references cited.